United States Patent
Ambroise

(10) Patent No.: US 12,090,732 B2
(45) Date of Patent: Sep. 17, 2024

(54) COATED, ORIENTED, LINEAR, LOW-DENSITY, POLYETHYLENE FILMS

(71) Applicant: Jindal Films Americas LLC, LaGrange, GA (US)

(72) Inventor: Benoît Ambroise, Norbressart (BE)

(73) Assignee: Jinda Films Americas LLC, LaGrange, GA (US)

( * ) Notice: Subject to any disclaimer, the term of this patent is extended or adjusted under 35 U.S.C. 154(b) by 684 days.

(21) Appl. No.: 15/993,660

(22) Filed: May 31, 2018

(65) Prior Publication Data

US 2018/0272672 A1 Sep. 27, 2018

Related U.S. Application Data

(63) Continuation of application No. PCT/US2017/012339, filed on Jan. 5, 2017.
(Continued)

(51) Int. Cl.
*B32B 27/08* (2006.01)
*B29C 48/00* (2019.01)
(Continued)

(52) U.S. Cl.
CPC .......... *B32B 27/08* (2013.01); *B29C 48/0018* (2019.02); *B29C 48/18* (2019.02); *B29C 55/143* (2013.01); *B29D 23/00* (2013.01); *B32B 7/10* (2013.01); *B32B 7/12* (2013.01); *B32B 15/08* (2013.01); *B32B 15/20* (2013.01); *B32B 27/16* (2013.01); *B32B 27/18* (2013.01); *B32B 27/20* (2013.01); *B32B 27/205* (2013.01); *B32B 27/28* (2013.01); *B32B 27/302* (2013.01); *B32B 27/304* (2013.01); *B32B 27/306* (2013.01); *B32B 27/32* (2013.01); *B32B 27/325* (2013.01); *B32B 27/327* (2013.01); *B65D 65/40* (2013.01); *B65D 65/42* (2013.01); *B29C 48/0022* (2019.02); *B29C 48/08* (2019.02); *B29C 48/10* (2019.02); *B29C 48/21* (2019.02); *B29C 48/91* (2019.02); *B29C 48/912* (2019.02); *B29C 48/9135* (2019.02); *B29C 55/02* (2013.01);
(Continued)

(58) Field of Classification Search
CPC ....... B32B 27/306; B32B 27/302; B32B 7/10; B32B 27/18; B32B 27/28; B32B 7/12; B32B 27/08; B32B 27/304; B32B 27/20; B32B 27/327; B32B 15/08; B32B 27/325; B32B 27/32; B32B 27/16; B32B 15/20; B32B 27/205; B32B 2307/7246; B32B 2307/408; B32B 2264/12; B32B 2307/7265; B32B 2307/412; B32B 2250/242; B32B 2307/748; B32B 2255/205; B32B 2307/746; B32B 2255/10; B32B 2255/28; B32B 2264/104; B32B 2307/4026; B32B 2307/518; B32B 2307/7244; B32B 2307/74; B32B 2264/102; B32B 2270/00; B32B 2439/70; B32B 2264/0264; B32B 2307/732; B32B 2264/101; B32B 2307/7242; B32B 2255/26; B32B 2264/0285; B32B 2264/025; B32B 2264/10; B32B 2307/546; B32B 2553/00; B32B 2264/107; B32B 2307/516; B32B 2250/03; B32B 2307/75; B32B 2307/72; B32B 2250/24; B32B 2264/105; B32B 2307/4023; B32B 2307/21; B32B 2307/406; B32B 2307/41; B29C 55/143; B29C 48/18; B29C 48/0018; B29C 48/9135; B29C 55/02; B29C 48/91; B29C 48/0022; B29C 48/21; B29C 48/08; B29C 48/912; B29D 23/00; B65D 65/42; B65D 65/40; B29K 2023/0625; B29K 2995/0053; B29L 2031/712
See application file for complete search history.

(56) References Cited

U.S. PATENT DOCUMENTS

| | | |
|---|---|---|
| 6,391,467 B1 | 5/2002 | Delisio et al. |
| 2005/0147834 A1* | 7/2005 | Bruchmann ............ B32B 27/00 428/458 |

(Continued)

FOREIGN PATENT DOCUMENTS

WO 2007/047133 A1 4/2007

OTHER PUBLICATIONS

Blaine R. Copenheaver, ISR and WO for PCT/US17/12339, Mar. 1, 20177.

(Continued)

*Primary Examiner* — Samir Shah
(74) *Attorney, Agent, or Firm* — Kearney, McWilliams & Davis; Erik J. Osterrieder

(57) ABSTRACT

Disclosed are biaxially oriented, multilayered films, wherein said films may include a core layer comprising linear, low-density polyethylene, and the core layer is optionally cavitated. Said films may further include a first skin layer on a first side of the core layer, and a second skin layer on a second side of the core layer, wherein the first skin layer and the second skin layer comprise thin layers of linear, low-density polyethylene of a same or different type. Further, said films may include an aqueous-based primer on an outer surface of the second skin layer, wherein the outer surface faces away from the core layer. Further still, said films may include a sealant coating layer on the first skin layer and a barrier coating layer on the second skin layer, wherein the sealant coating layer and the barrier coating layer are aqueous-based.

12 Claims, No Drawings

Related U.S. Application Data

(60) Provisional application No. 62/275,610, filed on Jan. 6, 2016.

(51) Int. Cl.

| | | |
|---|---|---|
| *B29C 48/18* | (2019.01) | |
| *B29C 55/14* | (2006.01) | |
| *B29D 23/00* | (2006.01) | |
| *B32B 7/10* | (2006.01) | |
| *B32B 7/12* | (2006.01) | |
| *B32B 15/08* | (2006.01) | |
| *B32B 15/20* | (2006.01) | |
| *B32B 27/16* | (2006.01) | |
| *B32B 27/18* | (2006.01) | |
| *B32B 27/20* | (2006.01) | |
| *B32B 27/28* | (2006.01) | |
| *B32B 27/30* | (2006.01) | |
| *B32B 27/32* | (2006.01) | |
| *B65D 65/40* | (2006.01) | |
| *B65D 65/42* | (2006.01) | |
| *B29C 48/08* | (2019.01) | |
| *B29C 48/10* | (2019.01) | |
| *B29C 48/21* | (2019.01) | |
| *B29C 48/88* | (2019.01) | |
| *B29C 48/91* | (2019.01) | |
| *B29C 55/02* | (2006.01) | |
| *B29K 23/00* | (2006.01) | |
| *B29L 31/00* | (2006.01) | |

(52) U.S. Cl.
CPC ............ *B29K 2023/0625* (2013.01); *B29K 2995/0053* (2013.01); *B29L 2031/712* (2013.01); *B32B 2250/03* (2013.01); *B32B 2250/24* (2013.01); *B32B 2250/242* (2013.01); *B32B 2255/10* (2013.01); *B32B 2255/205* (2013.01); *B32B 2255/26* (2013.01); *B32B 2255/28* (2013.01); *B32B 2264/025* (2013.01); *B32B 2264/0264* (2013.01); *B32B 2264/0285* (2013.01); *B32B 2264/10* (2013.01); *B32B 2264/101* (2013.01); *B32B 2264/102* (2013.01); *B32B 2264/104* (2013.01); *B32B 2264/105* (2013.01); *B32B 2264/107* (2013.01); *B32B 2264/12* (2013.01); *B32B 2270/00* (2013.01); *B32B 2307/21* (2013.01); *B32B 2307/4023* (2013.01); *B32B 2307/4026* (2013.01); *B32B 2307/406* (2013.01); *B32B 2307/408* (2013.01); *B32B 2307/41* (2013.01); *B32B 2307/412* (2013.01); *B32B 2307/516* (2013.01); *B32B 2307/518* (2013.01); *B32B 2307/546* (2013.01); *B32B 2307/72* (2013.01); *B32B 2307/7242* (2013.01); *B32B 2307/7244* (2013.01); *B32B 2307/7246* (2013.01); *B32B 2307/7265* (2013.01); *B32B 2307/732* (2013.01); *B32B 2307/74* (2013.01); *B32B 2307/746* (2013.01); *B32B 2307/748* (2013.01); *B32B 2307/75* (2013.01); *B32B 2439/46* (2013.01); *B32B 2439/70* (2013.01); *B32B 2553/00* (2013.01)

(56) References Cited

U.S. PATENT DOCUMENTS

| | | | |
|---|---|---|---|
| 2010/0203311 A1* | 8/2010 | Michie, Jr. .......... | C08L 23/0815 428/220 |
| 2012/0157598 A1* | 6/2012 | Song ..................... | B29C 48/08 524/445 |
| 2012/0177859 A1 | 7/2012 | Gavel et al. | |
| 2012/0219779 A1* | 8/2012 | Lernoux ................ | B32B 27/08 428/218 |
| 2012/0288692 A1 | 11/2012 | Broyles et al. | |
| 2014/0314920 A1 | 10/2014 | Beckwith et al. | |
| 2015/0104627 A1 | 4/2015 | O'Donnell et al. | |
| 2015/0283029 A1 | 10/2015 | Riis et al. | |

OTHER PUBLICATIONS

Erik J. Osterrieder, Article 34 Claims and Statement for PCT/US17/12339, Sep. 8, 2017.

\* cited by examiner

COATED, ORIENTED, LINEAR, LOW-DENSITY, POLYETHYLENE FILMS

REFERENCE TO RELATED APPLICATION

The present application is a Patent Cooperation Treaty (PCT) application, which claims priority to the U.S. provisional patent application Ser. No. 62/275,610 filed Jan. 6, 2016, which is hereby incorporated by reference in its entirety.

FIELD

This disclosure relates to thinly coated, oriented, linear, low-density, polyethylene films, and methods and uses pertaining to the same.

BACKGROUND

Cast or blown unoriented polyethylene ("PE") or polypropylene ("PP") films are broadly used as sealants in packaging or other applications. Such films generally have mediocre physical properties, and, consequently, are combined with other web materials, such as paper, polyethylene terephthalate ("PET"), biaxially oriented ("BO") polypropylene ("PP"), polyamides such as nylon, aluminum foil, or other material in order to provide barrier protection. This disclosure provides for new multilayer films and methods therefor that combine barrier protection with enhanced sealing properties, e.g., high seal strengths, remarkable hermetic seals, and significant seal-through-contamination in the sealing area, for example fluids, oils, powders or fibers. Moreover, these new multilayer films provide barrier protection with enhanced sealing properties at reduced thicknesses, a result that translates into a reduced amount of packaging while providing the same or improved performances. To effect these enhanced sealing and barrier properties, disclosed are new and thin oriented, linear, low-density, polyethylene ("LLDPE") multilayer films that have water-based coatings, which is significant because these films ordinarily possess low mechanical properties, which ordinarily would not withstand the coating process and removal of water in the coating by a dryer oven. Advantageously, the multilayer film may also be cavitated to provide a light barrier, a white appearance and a yield advantage, i.e., more surface per kilogram of film.

SUMMARY

In one example embodiment, disclosed is a biaxially oriented, multilayered film, wherein said film may include a core layer comprising linear, low-density polyethylene, and the core layer is optionally cavitated that affects whether the film is at least substantially clear or white-opaque, the latter being by virtue of cavitation. Said film may further include a first skin layer on a first side of the core layer, and a second skin layer on a second side of the core layer, wherein the first skin layer and the second skin layer comprise linear, low-density polyethylene of a same or different type. Further, said film may include an aqueous-based primer on an outer surface of the second skin layer, wherein the outer surface faces away from the core layer. Further still, said film may include a sealant coating layer on the first skin layer and a barrier coating layer on the second skin layer, wherein the sealant coating layer and the barrier coating layer are aqueous-based.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are now be described, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 $g/cm^3$ to 0.920 $g/cm^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

In various embodiments, disclosed are multilayer films, typically a polymeric film having improved sealing properties, comprising a core layer, optionally one or more tie layers intermediate on one or both sides of the core, a sealant layer on at least one side of the core (or tie layer(s) if present), and, in some embodiments comprise sealant layers on both sides of the core (optionally with tie layer(s) therebetween). The sealant layer(s) may be treated and metallized, and optionally have polymer coating(s), whether with or without primer(s), and/or skin layer(s).

Core Layer

As is known to those skilled in the art, the core layer of a multilayered film is most commonly the thickest layer and provides the foundation of the multilayered structure. In some embodiments, the core layer consists essentially of linear, low-density polyethylene ("LLDPE") and is substantially free from other components. In alternate embodiments, the core may also contain lesser amounts of additional polymer(s) selected from the group consisting of propylene polymer, ethylene polymer, ethylene-propylene copolymers, ethylene-propylene-butene terpolymers, elastomers, plastomers, and combinations thereof. Although not limiting in any way, two examples of suitable LLDPE were: (1) one with a melting index of 1 to 3 g/10 min (measured at 190° C.-2.13 Kg conditions), a density of 0.915 to 0.930 g/cm$^3$, and a melting peak of 115 to 135° C.

The core layer may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Hydrocarbon resins that may be suitable for use as described herein include EMPR 120, 104, 111, 106, 112, 115, EMFR 100 and 100A, ECR-373 and ESCOREZ® 2101, 2203, 2520, 5380, 5600, 5618, 5690 (commercially available from ExxonMobil Chemical Company of Baytown, Tex.); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla.); SYLVATAC™ and SYLVALITE™ rosin esters (commercially available from Arizona Chemical Company of Jacksonville, Fla.); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ C5/C9 resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa.); FORAL™, PENTALYN™, and PERMALYN™ rosins and rosin esters (commercially available from Hercules, now Eastman Chemical Company of Kingsport, Tenn.); QUINTONE™ acid modified C5 resins, C5/C9 resins, and acid modified C5/C9 resins (commercially available from Nippon Zeon of Japan); and LX™ mixed aromatic/cycloaliphatic resins (commercially available from Neville Chemical Company of Pittsburgh, Pa.); CLEARON™ hydrogenated terpene aromatic resins (commercially available from Yasuhara of Japan); and PICCOLYTE™ (commercially available from Loos & Dilworth, Inc. of Bristol, Pa.). Other suitable hydrocarbon resins may be found in U.S. Pat. No. 5,667,902, incorporated herein by reference. The preceding examples are illustrative only and by no means limiting.

The amount of such hydrocarbon resins, either alone or in combination, in the core layer is preferably less than 20 wt %, more preferably in the range of from 1 wt % to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt % of the core layer, but some embodiments may comprise additives in the core layer in an amount up to about 30 wt % of the core layer.

The core layer preferably has a thickness in the range of from about 5 μm to 100 μm, more preferably from about 5 μm to 50 μm, most preferably from 5 μm to 25 μm.

Tie Layer(s)

Tie layer(s) of a multilayered film is typically used to connect two other layers of the multilayered film structure, e.g., a core layer and a sealant layer, and is positioned intermediate these other layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, or combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers, such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 μm, preferably from about 0.50 μm to 12 μm, more preferably from about 0.50 μm to 6 μm, and most preferably from about 2.5 μm to 5 μm. However, in some thinner films, the tie layer thickness may be from about 0.5 μm to 4 μm, or from about 0.5 μm to 2 μm, or from about 0.5 μm to 1.5 μm.

A skin layer is optional, and, when present, is provided on the outer surface(s) surface of the tie layer(s) or core layer. Skin layer(s) may be provided to improve the film's barrier properties, processability, printability, and/or compatibility for metallization, coating, and lamination to other films or substrates.

In some embodiments, the skin layer comprises at least one polymer selected from the group consisting of a polyethylene polymer or copolymer, a polypropylene polymer or copolymer, an ethylene-propylene copolymer, an ethylene-propylene-butene ("EPB") terpolymer, a propylene-butene copolymer, an ethylene-vinyl alcohol polymer, and combinations thereof. Preferably, the polyethylene polymer is LLDPE such as Exceed™ resin from ExxonMobil Chemicals or Evolue™ resin from Prime Polymer or Elite™ resin from Dow. A suitable ethylene-propylene copolymer is Fina 8573 (commercially available from Fina Oil Company of Dallas, Tex.). A suitable EPB terpolymer is Chisso 7510 and 7794 (commercially available from Chisso Corporation of Japan). For coating and printing functions, the skin layer may preferably be surface-treated. For metallizing or barrier properties, the skin layer may contain LLDPE or ethylene vinyl alcohol based polymer(s) ("EVOH"). Suitable EVOH copolymer is EVAL™ G176B or XEP 1300 (commercially available from Kuraray Company Ltd. of Japan).

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.50 μm to 3.5 μm, preferably from about 0.50 μm to 2 μm, and in many embodiments most preferably from about 0.50 μm to 1.5 μm. Also, in thinner film embodiments, the skin layer thickness may range from about 0.50 μm to 1.0 μm, or 0.50 μm to 0.75 μm.

Coating

In some embodiments, one or more coatings, such as for barrier, printing and/or processing, may be applied to outer surface(s) of the multilayered films. For instance, the coating(s) may be directly on the outer surfaces (i.e., those surfaces facing away from the core) of tie layers, on either or both sides of the core layer, or elsewhere. Such coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings may be applied by an emulsion or solution coating technique or by co-extrusion and/or lamination.

The PVdC coatings that are suitable for use with the multilayered films are any of the known PVdC compositions heretofore employed as coatings in film manufacturing operations, e.g., any of the PVdC materials described in U.S. Pat. Nos. 4,214,039, 4,447,494, 4,961,992, 5,019,447, and 5,057,177, incorporated herein by reference.

Known vinyl alcohol-based coatings, such as PVOH and EVOH, that are suitable for use with the multilayered films include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying the coating composition to the appropriate substrate, the outer surface(s) of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, flame treatment and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto.

The coating composition can be applied to the film as a water-based solution. The coating composition may be applied to the treated surface in any convenient manner, such as by gravure coating, roll coating, dipping, spraying, and the like. The excess aqueous solution can be removed by squeeze rolls, doctor knives, and the like.

Additives

Additives that may be present in one or more layers of the multilayered films, include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives may be used in effective amounts, which vary depending upon the property required. Additives such as oxygen scavenger or gas scavenger can be added in any layer.

Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 μm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is high molecular PDSM (poly dimethyl siloxane) silicone gum.

Non-migratory slip agents, used in one or more skin layers of the multilayered films, may include polymethyl methacrylate (PMMA). The non-migratory slip agent may have a mean particle size in the range of from about 0.5 μm to 8 μm, or 1 μm to 5 μm, or 2 μm to 4 μm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be coated with a wax-containing coating, for lubricity, in amounts ranging from 2 wt % to 15 wt % based on the total weight of the skin layer. Any conventional wax, such as, but not limited to Carnauba™ wax (commercially available from Michelman Corporation of Cincinnati, Ohio) that is useful in thermoplastic films is contemplated.

Orientation

The embodiments include possible uniaxial or biaxial orientation of the multilayered films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times the extruded width in the machine direction and between about four to about ten times the extruded width in the transverse direction. Typical commercial orientation processes are BOPP tenter process, blown film, and LISIM technology.

Surface Treatment

One or both of the outer surfaces of the multilayered films, and, in particular, the barrier coating layer and/or the sealant coating layer as well as the outer surface of any skin layer that is optionally primed, may be surface-treated to increase the surface energy to render the film receptive to metallization, coatings such as skins for printing/or processing, printing inks, and/or lamination. The surface treatment can be carried out according to one of the methods known in the art including corona discharge, flame, plasma, chemical treatment, or treatment by means of a polarized flame.

Metallization

Outer surface(s) (i.e., the side facing away from the core) of the multilayered films may be metallized. For example, outer surfaces of the sealant layers and/or skin layers may undergo metallization after optionally being treated. Metallization may be carried out through conventional methods, such as vacuum metallization by deposition of a metal layer such as aluminum, copper, silver, chromium, or mixtures thereof and/or achieved through use of metallic oxides.

Priming

A primer coating ("primer") may be applied to any surface of the multilayered films. In this case, the film may be first treated by one of the foregoing methods to provide increased active adhesive sites thereon and to the thus-treated film surface there may be subsequently applied a continuous coating of primer, which include, for example, epoxy and poly(ethylene imine) (PEI) materials. U.S. Pat. Nos. 3,753,769, 4,058,645 and 4,439,493, each incorporated herein by reference, disclose the use and application of such primers. The primer provides an overall adhesively active surface for thorough and secure bonding with the subsequently applied coating composition and can be applied to the film by conventional solution coating means, for example, by roller application.

The films herein are also characterized in certain embodiments as being biaxially oriented. The films may be made by any suitable technique known in the art, such as a tenter process, double bubble process, LISIM™, or others. Further, the working conditions, temperature settings, lines speeds, etc. will vary depending on the type and the size of the equipment used. Nonetheless, described generally here is one method of making the films described throughout this disclosure. In one particular embodiment, the films are formed and biaxially oriented using the "tentered" method. In the tenter process, sheets/films of the various materials are melt-blended and coextruded, such as through a 3, 4, 5, 7-layer die head, into the desired film structure. Extruders may be used to melt-blend the molten layer materials, the melt streams then metered to the die. The extruded sheet is then cooled using air, water, or both.

Downstream of the first cooling step in this example embodiment of the tentered process, the unoriented sheet is re-heated to a temperature of from 60 to 100 or 120 or 150° C. by any suitable means, such as heated S-wrap rolls, and then passed between closely spaced differential speed rolls to achieve machine-direction orientation. It is understood by those skilled in the art that this temperature range may vary depending upon the equipment, and, in particular, upon the identity and composition of the components constituting the film. Ideally, the temperature will be below that which will melt the film, or cause it to become tacky and adhere to the equipment, but high enough to facilitate the machine-direction orientation process. Notably, such temperatures referred to herein refer to the film temperature, itself. The film temperature may be measured by using, for example, infrared spectroscopy, the source being aimed at the film as it is being processed; those skilled in the art will understand that measuring the actual film temperature may not be precise and/or fully accurate. In this case, those skilled in the art may estimate the temperature of the film by knowing the temperature of the air or roller immediately adjacent to the film that is measured by any suitable means. The heating means for the film line may be set at any appropriate level of heating, depending upon the instrument, to achieve the stated or desired film temperatures.

Subsequently, the lengthened and thinned film is cooled and passed to the tenter section of the line for TD orientation. At this point, the edges of the sheet are grasped by mechanical clips on continuous chains and pulled into a long, precisely controlled, hot-air oven for a pre-heating step. The film temperatures may range from 80 or 110 to 150 or 160° C. in the pre-heating step. Again, the temperature is ideally below that which will melt the film, but high enough to facilitate the step of transverse-direction orientation. Next, the edges of the sheet are grasped by mechanical clips on continuous chains and pulled into a long, precisely controlled, hot-air oven for transverse stretching. The tenter chains diverge a desired amount to stretch the film in the transverse direction at a temperature high enough to facilitate the step of transverse-direction orientation but low enough so as not to melt the film. After stretching to the required transverse orientation, the film is then cooled from 5 to 10 or 15 or 20 or 30 or 40° C. below the stretching temperature, and the mechanical clips are released prior to any edge trimming Thereafter, optional corona or any other treatment may take place followed by winding.

Thus, in certain embodiments the film(s) described herein are biaxially oriented with at least a 5 or 6 or 7 or 8-fold TD orientation and at least a 2 or 3 or 4-fold MD orientation.

In various embodiments, cavitation and/or opacity-inducing agents are substantially absent, meaning that they are not present in the core in any detectable amount. Examples of cavitation and/or opacity-inducing agents includes calcium carbonate, talc, carbon black, clay, untreated silica and alumina, zinc oxide, mica, asbestos, barites, magnesium carbonate and mixtures thereof, as well as those materials made from polybutylene terephthalate, nylon-6, cyclic olefin copolymers particles, and other particles that are phase-distinct from the core layer material, and having a size that, during orientation, will create cavities in the core layer.

INDUSTRIAL APPLICABILITY

The disclosed multilayered films may be are as stand-alone films, laminates, or webs. Or, the multilayered films may be sealed, coated, metallized, and/or laminated to other film structures. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

EXPERIMENTAL

As non-limiting examples, two biaxially oriented polyethylene films were made, one being clear and the other being cavitated, and had the structures reported in Table 1. In other embodiments, LLDPE was used instead of m-LLDPE in one or more of the skin and/or core layers.

TABLE 1

| | Clear ORIENTED LLDPE | | Cavitated ORIENTED LLDPE | |
|---|---|---|---|---|
| Layer | Composition | Thickness | Composition | Thickness |
| first skin layer | metallocene LLDPE[1] + 1000 ppm zeolite (5 µm) | 1 µm | metallocene LLDPE[1] | 1 µm |
| core | — | — | metallocene LLDPE[1] | 5 µm |
| | metallocene LLDPE[1] | 23 µm | 80 wt % metallocene LLDPE[1] + 20% (70 wt % CaCO$_3$ in HDPE)[3] | 26.5 µm |
| | — | — | metallocene LLDPE[1] | 5 µm |
| second skin layer | metallocene LLDPE[2] + 1000 ppm zeolite (5 µm) | 1 µm | metallocene LLDPE[2] + 1000 ppm zeolite (5 µm) | 1 µm |

[1] e.g., MI = 1.9, ρ = 0.927 g/cm$^3$, $T_m$ = 127° C. (one type of m-LLDPE)
[2] e.g., MI = 3.8, ρ = 0.913 g/cm$^3$, $T_m$ = 113° C. (another type of m-LLDPE)
[3] e.g., Schulman Polybatch FCC 7310 HD The following properties were measured for the clear and cavitated films of Table 1 and reported now in Table 2.

TABLE 2

| | Clear ORIENTED LLDPE | Cavitated ORIENTED LLDPE |
|---|---|---|
| Yield | 36.4 m$^2$/kg | 35.3 m$^2$/kg |
| Optical Gauge (ASTM D6988-08) | 29.0 µm | 38.5 µm |

TABLE 2-continued

|  | Clear ORIENTED LLDPE | Cavitated ORIENTED LLDPE |
|---|---|---|
| Density (calculated) | 0.947 g/cm$^3$ | 0.736 g/cm$^3$ |
| Haze (ASTM D1003) | 4.6% | — |
| Light Transmission (ASTM D1003) | — | 55% |
| WVTR 38° C./ 90% RH (ASTM F1249) | 15 g/m$^2$/d | 14 g/m$^2$/d |
| OTR 23° C./ 0% RH (ASTM D3895) | Expected >1000 | Expected >1000 |

Thereafter, the clear and cavitated oriented metallocene-LLDPE films of Table 2 were coated. Specifically, each film was coated on one side of the film with a sealant coating sometimes used on biaxially polypropylene films, and coated on the opposite side of the film with a barrier coating to enhance barriers to water or gas. A gravure coating method was employed, but other coating methods, such as roll coating, dipping, spraying, etc., could be used in alternative embodiments. Excess aqueous solution may be removed by squeeze rolls, doctor knives, etc. The coating composition will ordinarily be applied in such an amount that there will be deposited, following drying, a smooth, evenly distributed layer of from about 0.5 μm to about 2.5 μm in thickness.

Coating layers having the compositions shown in Table 3 were prepared.

TABLE 3

| Sealant Coating | PVdC Barrier Coating | PVOH Barrier Coating |
|---|---|---|
| 100 phr[1] EAA dispersion[2] | 100 phr Solavay Ixan PA297 | 100 phr Michelman ME90508PE (PVOH dispersion) |
| 1.2 phr NaOH | 2.4 phr carnauba was dispersion[3] | 15 phr cross-linker[4] |
| 4 phr carnauba was dispersion[3] | 0.2 phr ammonia |  |
| 1500 ppm poly(methyl methacrylate) - 4 μm particles/microspheres | 800 ppm silica particles/microsphere - 4 μm |  |

[1]phr = parts by weight per hundred parts
[2]e.g., Paramelt Aquaseal™ 2093
[3]e.g., Michelman wax ML215
[4]e.g., Cymel ® Parez 707

First, aqueous-based primer(s) based on polyethylenimine, modified or not, were applied to oriented LLDPE films of this disclosure and then coated at a weight of 0.8 g/m$^2$ with the sealant coating layer of Table 3. Second, aqueous primer(s) based on polyurethane, modified or not, were applied to oriented LLDPE films of this disclosure and then coated at a weight of 3.0 g/m$^2$ with the PVdC barrier coating layer of Table 3. And, third, aqueous primer(s) based on polyethylenimine, modified or not, were applied to oriented LLDPE films of this disclosure and then coated at a weight of 0.6 g/m$^2$ with the PVOH barrier coating layer of Table 3. Subsequently, measurements were made on the barrier-coating-layer side of the clear oriented LLDPE films reported in Tables 1 and 2 that have either a PVdC aqueous-based primer or PVOH aqueous-based primer located on the outer surface (i.e., facing away from the core layer as opposed to an "interior surface," which faces toward the core layer) of the second skin layer, and these measurements are reported in Table 4.

TABLE 4

|  | Sealant Coating on Clear ORIENTED LLDPE | PVdC Barrier Coating on Clear ORIENTED LLDPE | PVOH Barrier Coating on Clear ORIENTED LLDPE |
|---|---|---|---|
| Haze (ASTM D1003) | 3.4% | 4.0% | 3.2% |
| Gloss (45°) (ASTM D 523) | 80% | 78% | 84% |
| WVTR 38° C./ 90% RH (ASTM F1249) | not measured because expected to be the same as prior to coating | 3.9 g/m$^2$/d | not measured because expected to be the same as prior to coating |
| OTR 23° C./ 0% RH (ASTM D3895) | not measured because expected to be the same as prior to coating | 37 cm$^3$/m$^2$/d | 0.1 cm$^3$/m$^2$/d |

Oriented, metallocene-LLDPE films, just like the ones in Table 4, were laminated on the barrier coating to 12 μm polyethylene terephthalate; thereafter, the properties were measured and reported in Table 5. Both the PVdC- and PVOH-coated films, whether laminated (i.e., Table 5) or not (i.e., Table 4), exhibited good water and oxygen barrier properties.

TABLE 5

|  | PVdC Barrier Coating on Clear ORIENTED LLDPE | PVOH Barrier Coating on Clear ORIENTED LLDPE |
|---|---|---|
| WVTR 38° C./ 90% RH (ASTM F1249) | 5.3 g/m$^2$/d | 14.1 g/m$^2$/d |
| OTR 23° C./ 0% RH (ASTM D3895) | 19 cm$^3$/m$^2$/d | 0.1 cm$^3$/m$^2$/d |

Turning now to Table 6, reported are sealing properties of the oriented, metallized, metallocene-LLDPE films that were laminated to 12 μm polyethylene terephthalate, i.e., just like the ones in Table 5. Using standard testing method of ASTM F2029, an Otto Brugger sealer with crimp jaws was used at a pressure of 410 kPa and a dwell time of 0.75 s over a range of temperatures from 70° C. to 150° C. on the laminates. The measurements showed that the LTSC coatings provided high seal strengths for the top coating used in the cavitated oriented LLDPE film in Table 1. At present, it is undetermined whether cavitation, the top coating, the coated skin or a combination are required to provide these high seal strengths.

TABLE 6

| | Table 1 Film | | | | | |
|---|---|---|---|---|---|---|
| | Clear ORIENTED LLDPE | Clear ORIENTED LLDPE | Clear ORIENTED LLDPE | Cavitated ORIENTED LLDPE | Cavitated ORIENTED LLDPE | Cavitated ORIENTED LLDPE |
| | | | sealing side | | | |
| Jaw Temperature | mLLDPE 1 uncoated | mLLDPE 2 uncoated | mLLDPE 1 top coated with sealant coating | mLLDPE 2 uncoated | mLLDPE 1 top coated with sealant coating | mLLDPE 2 top coated with sealant coating |
| 70° C. | 0 g/cm | 0 g/cm | 50 g/cm | 0 g/cm | 160 g/cm | 480 g/cm |
| 80° C. | 0 g/cm | 0 g/cm | 120 g/cm | 20 g/cm | 240 g/cm | 870 g/cm |
| 90° C. | 0 g/cm | 40 g/cm | 150 g/cm | 300 g/cm | 260 g/cm | 780 g/cm |
| 100° C. | 10 g/cm | 1130 g/cm | 140 g/cm | 1110 g/cm | 270 g/cm | 1120 g/cm |
| 110° C. | 40 g/cm | 1200 g/cm | 140 g/cm | 1030 g/cm | 310 g/cm | 1030 g/cm |
| 120° C. | 100 g/cm | 1400 g/cm | 380 g/cm | 670 g/cm | 320 g/cm | 870 g/cm |
| 130° C. | 4350 g/cm | 5470 g/cm | 1750 g/cm | 3390 g/cm | 2010 g/cm | 3200 g/cm |
| 140° C. | 6960 g/cm | 7060 g/cm | 1660 g/cm | 4970 g/cm | 1270 g/cm | 3710 g/cm |
| 150° C. | 7550 g/cm | 7710 g/cm | 1710 g/cm | 5420 g/cm | 1940 g/cm | 3690 g/cm |

In view of the foregoing, various bags, packages, pouches (e.g., stand-up, vertical fill-and-seal, horizontal fill-and-seal, etc.), films, laminates, and other structures may be formed from the above-described films, wherein such may have products (e.g., food, beverages) of any phase that require seals having requisite integrity and/or barriers to water and/or oxygen transmission.

Below are further example embodiments of the disclosed film written as if they are claims:

1. A biaxially oriented multilayered film comprising:
    a core layer comprising linear, low-density polyethylene, wherein the core layer is optionally cavitated;
    a first skin layer on a first side of the core layer, and a second skin layer on a second side of the core layer, wherein the first skin layer and the second skin layer comprise linear, low-density polyethylene of a same or different type;
    an aqueous-based primer on an outer surface of the second skin layer, wherein the outer surface faces away from the core layer;
    a sealant coating layer on the first skin layer; and
    a barrier coating layer on the second skin layer,
    wherein the sealant coating layer and the barrier coating layer are aqueous-based.
2. The biaxially oriented multilayered film of claim 1, wherein the core layer further comprises one or more hydrocarbon resins.
3. The biaxially oriented multilayered film of claim 1, further comprising one or more additives.
4. The biaxially oriented multilayered film of claim 1, further comprising one or more tie layers.
5. The biaxially oriented multilayered film of claim 1, wherein the first skin layer, the second skin layer, or both further comprise zeolite.
6. The biaxially oriented multilayered film of claim 1, wherein each of the first skin layer and the second skin layer are 1 µm or less in thickness.
7. The biaxially oriented multilayered film of claim 1, wherein each of the sealant coating layer and the barrier coating layer have a dried coating thickness within a range from 0.5 through 2.5 µm.
8. The biaxially oriented multilayered film of claim 1, further comprising one or more surface treatments layers applied intermediate to: (a) the second skin layer and the barrier coating; (b) the barrier coating and a metallized layer; (c) the first skin layer and a primer adjacent to the sealant coating; (d) the first skin layer and the sealant coating; or (e) combinations thereof.
9. The biaxially oriented multilayered film of claim 1, further comprising one or more printing and/or processing coatings located the outer surface of the sealant coating layer, the barrier coating layer, or both.
10. The biaxially oriented multilayered film of claim 1, further comprising a primer applied to the outer surface of the first skin layer.
11. The biaxially oriented multilayered film of claim 1, further comprising a metallized layer on to the barrier coating layer, wherein, optionally, the barrier coating is surface-treated.
12. The biaxially oriented multilayered film of claim 1, wherein the linear, low-density, polyethylene comprises one or more types of metallocene, linear, low-density, polyethylene.
13. The biaxially oriented multilayered film of claim 1, wherein water-vapor transmission rate is equal to or less than 5 g/m$^2$/d.
14. The biaxially oriented multilayered film of claim 1, wherein oxygen transmission rate is equal to or less than 40 cm$^3$/m$^2$/d.
15. The biaxially oriented multilayered film of claim 1, further comprising a lamination layer on the barrier coating layer to produce a laminated film.
16. The biaxially oriented multilayered film of claim 15, wherein oxygen transmission rate is equal to or less than 20 cm$^3$/m$^2$/d.
17. The biaxially oriented multilayered film of claim 15, wherein oxygen transmission rate is equal to or less than 1 cm$^3$/m$^2$/d and the barrier coating layer comprises polyvinyl alcohol.
18. The biaxially oriented multilayered film of claim 15, wherein the laminated film has a seal strength of at least 1250 g/cm$^3$ at temperatures within a range from 130° C. through 150° C. under a pressure of 410 kPa and a dwell time of 0.75 s.
19. Use of the multilayered film of claim 1 as a package.
20. Use of the multilayered film of claim 15 as a package.

While the foregoing is directed to example embodiments of the disclosed invention, other and further embodiments may be devised without departing from the basic scope thereof, wherein the scope of the disclosed apparatuses, systems and methods are determined by one or more claims.

What is claimed is:

1. A biaxially oriented multilayered film comprising:
a core layer consisting essentially of metallocene, linear, low-density polyethylene, wherein the core layer is cavitated;
a first skin layer on a first side of the core layer, and a second skin layer on a second side of the core layer, wherein the first skin layer and the second skin layer each comprise linear, low-density polyethylene of a different type;
an aqueous-based primer on an outer surface of the second skin layer, wherein the aqueous-based primer comprises epoxy or poly(ethylene imine), wherein the outer surface faces away from the core layer;
an aqueous-based sealant coating on the first skin layer, wherein the aqueous-based sealant coating comprises ethylene acrylic acid or ethylene methyl acrylate polymer; and
an aqueous-based barrier coating on the aqueous-based primer on the second skin layer, wherein the aqueous-based barrier coating comprises vinyl alcohol polymer.

2. The biaxially oriented multilayered film of claim 1, further comprising one or more additives.

3. The biaxially oriented multilayered film of claim 1, wherein the first skin layer, the second skin layer, or both further comprise zeolite.

4. The biaxially oriented multilayered film of claim 1, wherein the core layer is cavitated with ≤30 wt. % cavitating agents.

5. The biaxially oriented multilayered film of claim 1, further comprising one or more surface treatments layers applied intermediate to: (a) the second skin layer and the barrier coating; (b) the barrier coating and a metallized layer; (c) the first skin layer and a primer adjacent to the sealant coating; (d) the first skin layer and the sealant coating; or (e) combinations thereof.

6. The biaxially oriented multilayered film of claim 1, further comprising one or more printing and/or processing coatings located the outer surface of the sealant coating layer, the barrier coating layer, or both.

7. The biaxially oriented multilayered film of claim 1, further comprising a primer applied to the outer surface of the first skin layer.

8. The biaxially oriented multilayered film of claim 1, further comprising a metallized layer on to the barrier coating layer, wherein, optionally, the barrier coating is surface-treated.

9. The biaxially oriented multilayered film of claim 1, wherein the aqueous-based barrier coating is an exterior layer.

10. The biaxially oriented multilayered film of claim 1, wherein the aqueous-based barrier coating is located between the second skin layer and a metallized layer.

11. The biaxially oriented multilayered film of claim 1, further comprising a metallized layer on the aqueous-based sealant coating.

12. The biaxially oriented multilayered film of claim 1, wherein the aqueous-based barrier coating has a thickness from 0.5 μm through 2.5 μm.

* * * * *